(12) United States Patent
Derks et al.

(10) Patent No.: US 6,275,312 B1
(45) Date of Patent: Aug. 14, 2001

(54) OPTICAL ROUTING SWITCH

(75) Inventors: Michael J. Derks, Loveland, CO (US); Kuang-Yi Wu, Plano; Jian-Yu Liu, Garland, both of TX (US)

(73) Assignee: Chorum Technologies LP, Richardson, TX (US)

( * ) Notice: Subject to any disclaimer, the term of this patent is extended or adjusted under 35 U.S.C. 154(b) by 0 days.

(21) Appl. No.: 09/416,089

(22) Filed: Oct. 12, 1999

Related U.S. Application Data

(63) Continuation-in-part of application No. 09/063,611, filed on Apr. 21, 1998, now Pat. No. 6,049,404, which is a continuation-in-part of application No. 08/979,525, filed on Nov. 26, 1997, now Pat. No. 5,946,116.
(60) Provisional application No. 60/042,575, filed on Apr. 2, 1997.

(51) Int. Cl.[7] .................................................... H04J 14/06
(52) U.S. Cl. ...................... 359/117; 359/128; 359/156; 359/130
(58) Field of Search ................................ 359/124, 127, 359/130, 131, 117, 122, 156, 128

(56) References Cited

U.S. PATENT DOCUMENTS

| | | |
|---|---|---|
| 4,650,289 | 3/1987 | Kuwahara . |
| 4,720,171 | 1/1988 | Baker . |
| 4,989,941 | 2/1991 | Soref . |
| 5,013,140 | 5/1991 | Healey et al. . |
| 5,162,944 | 11/1992 | Yamamoto et al. . |
| 5,165,104 | 11/1992 | Weverka . |
| 5,204,771 | 4/1993 | Koga . |
| 5,317,658 | 5/1994 | Bergland et al. . |
| 5,363,228 | 11/1994 | DeJule et al. . |
| 5,381,250 | 1/1995 | Meadows . |
| 5,414,540 | 5/1995 | Patel et al. . |
| 5,414,541 | 5/1995 | Patel et al. . |
| 5,606,439 | * 2/1997 | Wu ....................................... 349/117 |
| 5,694,233 | 12/1997 | Wu et al. . |
| 5,724,165 | 3/1998 | Wu . |
| 5,771,120 | 6/1998 | Bergmann . |
| 5,963,291 | * 10/1999 | Wu et al. .............................. 349/196 |

FOREIGN PATENT DOCUMENTS

98/47254 * 10/1998 (WO) .................................... 359/122

\* cited by examiner

*Primary Examiner*—Leslie Pascal
(74) *Attorney, Agent, or Firm*—Dorr, Carson, Sloan & Birney, P.C.

(57) ABSTRACT

An optical routing switch employs a polarization-dependent routing (PDR) element formed by joining a plurality of prisms to form a substantially X-shaped interface between the prisms. A polarizing beam splitter (PBS) coating is applied to the interface, so that the interface transmits light having a first polarization along a transmitted optical path and reflects lights having a second, orthogonal polarization along a reflected optical path. A plurality of input/output ports are aligned to communicate optical signals along transmitted and reflected optical paths of the PDR element. Each input port has a birefringent element spatially separating the input optical signal into a pair of orthogonally-polarized beams, and a polarization rotator rotating the polarization of at least one of the pair of beams so that both beams have substantially the same polarization determined by the control state of the optical routing switch. Similarly, each output port has a polarization rotator that rotates the polarization of at least one of the pair of beams exiting the PDR element so that the beams have substantially orthogonal polarizations, and a birefringent element that combines the orthogonally-polarized beams into an output optical signal. Two PDR elements can be combined in an offset relationship to create a double ring add/drop switch or east/west protection switch.

19 Claims, 11 Drawing Sheets

OPTICAL ROUTING SWITCH

RELATED APPLICATION

The present invention is a continuation-in-part of the Applicants' co-pending U.S. patent application Ser. No. 09/063,611, now U.S. Pat. No. 6,049,404 entitled "N×M Digitally Programmable Optical Routing Switch," filed on Apr. 21, 1998, which is a continuation-in-part of U.S. patent application Ser. No. 08/979,525, now U.S. Pat. No. 5,946,116 filed on Nov. 26, 1997, which was based on U.S. Provisional Patent Application 60/042,575, entitled "1×$2^N$ Digitally Programmable Optical Routing Switch," filed on Apr. 2, 1997.

BACKGROUND OF THE INVENTION

1. Field of the Invention

The present invention relates generally to switching of optical signals; and in particular, to the spatial routing of optical signals transmitted in optical communication networks and optical signal processing.

2. Statement of the Problem

Optical fibers are used as the physical media for transmitting optical signals in a variety of commercial and military applications. As the data rates of information continue to grow, it becomes increasingly difficult for conventional electronic switching systems to handle higher bandwidths. in addition, the required conversion between optical and electrical signals restricts the data format and increases costs. All-optical routing/switching technologies, characterized by high "data transparency," can switch or transfer optical signals from one transmission channel to another while the signals remain in optical form.

Several multiplexing schemes have been developed in fiber optic interconnection networks, including time-division multiplexing (TDM), wavelength-division multiplexing (WDM) and space-division multiplexing (SDM). Space-division switching is considered to be one of the most important fiber optic routing schemes. Major applications of space-division photonic switches are in fiber optic communication networks, optical gyroscopes, optical signal processing, and micro/millimeter wave signal distribution for phased-array radar systems.

Optical systems have been developed to provide programmable routing schemes that can alter the path of an optical data stream without effecting the characteristics of the data stream. A wide variety of electromagnetic field-controlled optical switches are commercially available. They are based on mechanical, electro-optic, thermo-optic, acousto-optic, magneto-optic, and semiconductor technologies. Each switching technology has its own advantages, but also has drawbacks as well. For example, mechanical switches are the most widely used routing components and provide very low insertion loss and cross-talk characteristics, but their switching time is limited to the millisecond range. They also have a limited lifetime because motor-driven parts are used. LiNbO$_3$ integrated optic switches, on the other hand, offer nanosecond switching times. However, LiNbO$_3$ switches suffer from the disadvantages of relative large insertion loss (5 dB), high cross-talk (20 dB) and polarization dependency.

Polarization-based optical routing switches has been disclosed in the past. For example, Chorum Technologies, Inc. of Richardson, Tex., has developed devices using polarizers, waveplates, and liquid crystals to alter the polarization state of the light stream that allow for routing the light stream into different optical fibers. These devices have low insertion loss, polarization mode dispersion, crosstalk, and polarization dependent loss. The switching speed is comparable to that of mechanical switches. Designs based on cubic and rectangular polarizing beamsplitters have been produced at Chorum Technologies, Inc. to create 1×2, 1×8, 1×64, and add/drop switches.

Polarized beamsplitters have also been used in the past in optical routing switches. A polarized beamsplitter consists of two prisms epoxied together with one of the hypotenii having a thin-film PBS coating with alternating high and low index materials. This component reflects incoming light at a 90° angle that has one linear polarization state (S polarization) while allowing the orthogonal polarization state (P polarization) to pass through the hypotenuse coating.

This concept has been extended by Nitto Optical Corporation of Japan by joining four prisms to create an X-shaped interface between the prisms with a PBS coating. This X-cube device is used by Nitto Optical Corp. as an optical component in desktop projectors. In particular, the Nitto device is employed as a three-color combiner in video projectors. By controlling the polarization state of the individual color pixels, the intensity and color to the projected image can be controlled.

One example of a polarization-based optical routing switch is shown in U.S. Pat. No. 5,381,250 (Meadows). Meadows discloses a four-port optical routing switch in which four prisms are joined to form an X-shaped interface between the prisms. A polarizing beamsplitter (PBS) film is applied to the interface surfaces to selectively route light based on its polarization. Light having a first polarization is transmitted, while orthogonally-polarized light is reflected by the PBS film. Each port includes a polarizing beamsplitter that spatially separates an input beam into two orthogonally-polarized beams, a reflective prism that reflects one of the beams so that they become parallel, and two electro-optic retarders (or polarization rotators) that change the polarization of the beams so that both have the same polarization exiting the port.

However, the port configuration used by Meadows has several significant disadvantages. This approach is needlessly complex and therefore is more expensive and more difficult to maintain precise optical specifications. In addition, this approach has significant technical limitations in terms of polarization mode dispersion and polarization-dependent losses due to the non-parallel beam paths through each port.

3. Solution to the Problem

The present invention employs a polarization-dependent routing (PDR) element formed by joining a plurality of prisms to create a substantially X-shaped interface having a PBS coating. Each input/output port has a birefringent element and a polarization rotator. This optical routing structure provides polarization-independent and low crosstalk switching over a wide operating range of temperatures and wavelengths. This approach retains the switched signals in optical format and preserves their optical properties.

In addition, the present invention offers a significant advantage over Meadows in that each port maintains a substantially parallel beam path, thereby providing reduced polarization mode dispersion and polarization-dependent losses. The present invention is also simpler, less expensive, and is easier to fabricate than Meadows design.

SUMMARY OF THE INVENTION

This invention provides an optical routing switch that employs a polarization-dependent routing (PDR) element formed by joining a plurality of prisms to create a substantially X-shaped interface between the prisms. A PBS coating is applied to the interface, so that the interface transmits light having a first polarization along a transmitted optical path and reflects lights having a second, orthogonal polarization along a reflected optical path. A plurality of input/output ports are aligned to communicate optical signals along transmitted and reflected optical paths of the PDR element. Each input port has a birefringent element spatially separating the input optical signal into a pair of orthogonally-polarized beams, and a polarization rotator rotating the polarization of at least one of the pair of beams so that both beams have substantially the same polarization determined by the control state of the optical routing switch. Similarly, each output port has a polarization rotator that rotates the polarization of at least one of the pair of beams exiting the PDR element so that the beams have substantially orthogonal polarizations, and a birefringent element that combines the orthogonally-polarized beams into an output optical signal. Two PDR elements can be combined in an offset relationship to create a double ring add/drop switch or east/west protection switch.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which.

DETAILED DESCRIPTION OF THE INVENTION

2×2 Optical Routing Switch

Figure 1:
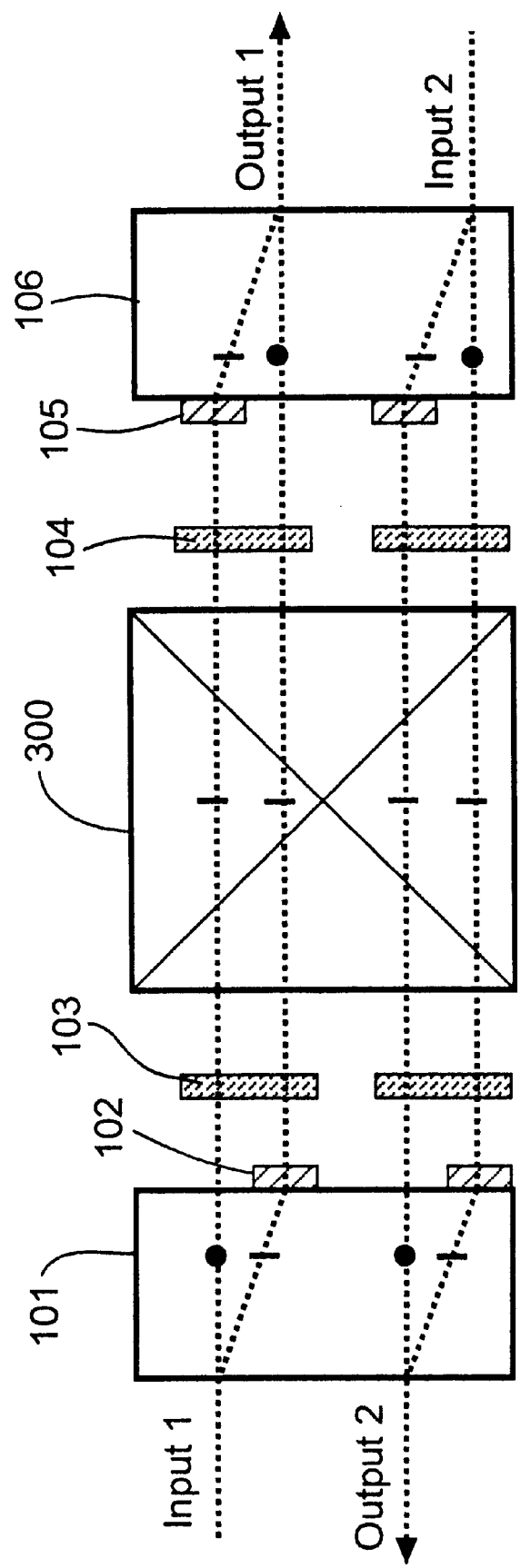
FIG. 1 is a simplified block diagram of the present invention configured as a 2×2 optical routing switch in a first control state.
Figure 2:
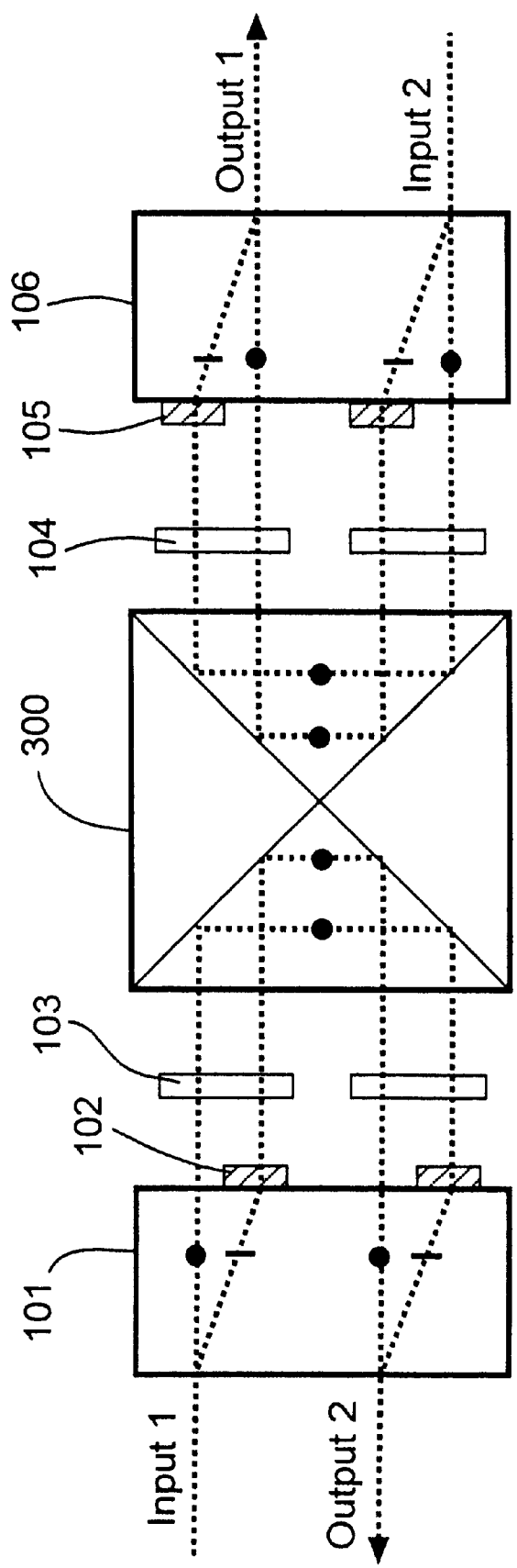
FIG. 2 is a simplified block diagram corresponding to FIG. 1 showing the 2×2 optical routing switch in a second control state.
Figure 3:
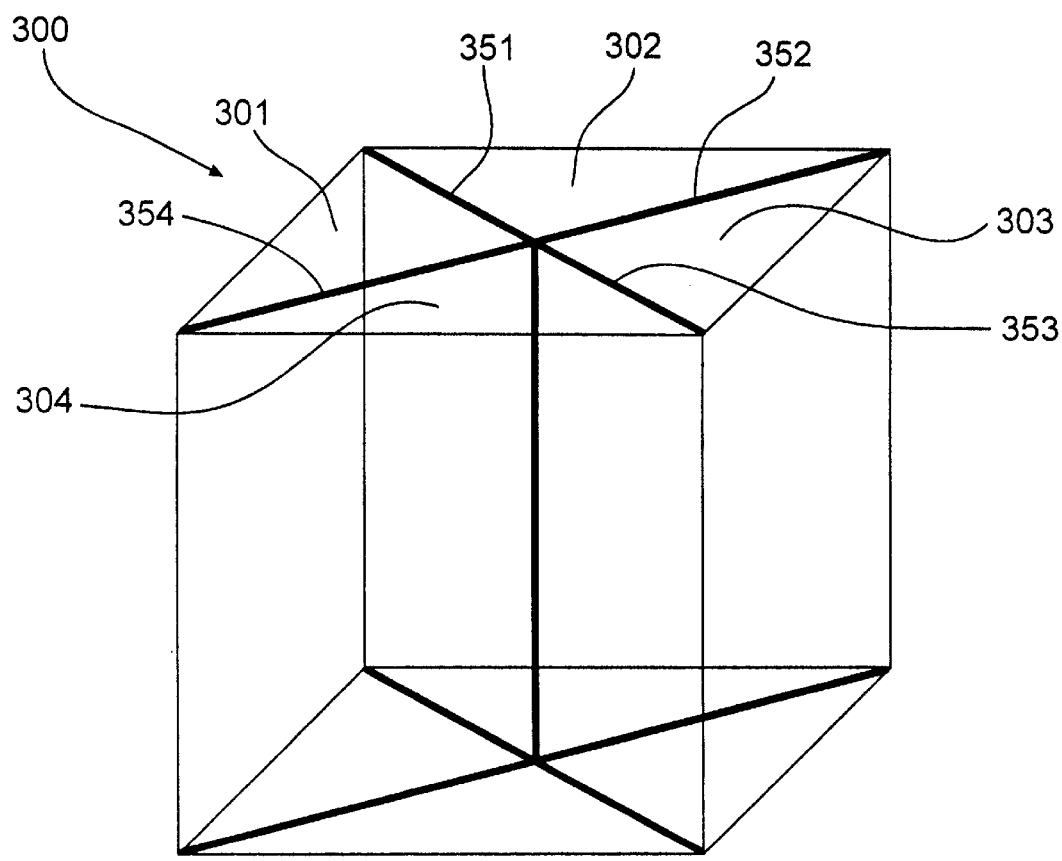
FIG. 3 is a perspective view of the polarization-dependent routing (PDR) element created by joining four prisms.

FIGS. 1 and 2 are block diagrams of the present invention configured as a 2×2 optical routing switch, showing both control states of the switch. FIG. 3 is a perspective view of the a polarization-dependent routing (PDR) element 300 created by joining four prisms 301–304 to create a substantially X-shaped interface 351–354 between the prisms 301–304. A polarizing beam splitter (PBS) coating is applied to the interface 351–354, so that the interface 351–354 transmits light having a first polarization along a transmitted optical path (shown in FIG. 1) and reflects lights having a second, orthogonal polarization along a reflected optical path (shown in FIG. 2).

As depicted in FIGS. 1 and 2, a plurality of input/output ports are aligned to communicate optical signals along transmitted and reflected optical paths within the PDR element 300. At each input port, the input optical signal passes through a birefringent element 101, 106 that spatially separates the input signal into a pair of orthogonally-polarized beams. The short vertical lines on the optical signal paths in FIGS. 1 and 2 indicate P polarization, and the small dots indicate S polarization.

A polarization rotator 102–105 then rotates the polarization of at least one of the pair of beams so that both beams have substantially the same polarization determined by the control state of the optical routing switch. Similarly, each output port includes a polarization rotator 102–105 that rotates the polarization of at least one of the pair of beams exiting the PDR element 300 so that the beams have substantially orthogonal polarizations. A birefringent element 101, 106 then combines the orthogonally-polarized beams into an output optical signal.

The precise embodiment shown in FIGS. 1 and 2 is a 2×2 optical routing switch in which two input ports and two output ports are arranged on opposing sides of the PDR element 300. The first output port receives the optical signal along a transmitted optical path through the PDR element 300 from the first input port in the first control state illustrated in FIG. 1. Similarly, the second output port receives the optical signal along a transmitted optical path through the PDR element 300 from the second input port in the first control state. In contrast, FIG. 2 depicts the second control state of the switch, in which the first output port receives the optical signal along a reflected optical path through the PDR element 300 from the second input port, and the second output ports receives the optical signal along a reflected optical path through the PDR element 300 from the first input port.

In this type of configuration, each input port is aligned on opposing sides of the PDR element 300 from a first output port so that the first output port receives the optical signal along a transmitted optical path through the PDR element in the first control state. A second output port is located on the same side of the PDR element 300 as the input port so that the second output port receives the optical signal along a reflected optical path through the PDR element 300 in the second control state.

The polarization rotator associated with each port can have any of number of possible configurations. The embodiment in FIGS. 1 and 2 includes a half-wave plate 102, 105 that rotates the polarization of one of the pair of beams by 90 degrees, and an electrically-controllable liquid-crystal polarization rotator 103, 104 that controllably rotates the polarization of both beams by 90 degrees in the first control state and by zero degrees in the second control state. In either control state, this results in a net rotation of 90 degrees for one of the beams, so that both beams emerge with substantially the same polarization. It should be understood that other types of polarization rotators could be used to achieve this result. For example, an array of two liquid-crystal polarization rotators can be employed at each port to individually rotate the polarization of both beams.

A single-cell liquid crystal polarization rotator is sufficient. However, switching time can be reduced to less than 15 msec by using a double-cell liquid crystal polarization rotator. The trade-off is a higher insertion loss of approximately 2.5 dB.

It should be understood that this optical routing switch is inherently bi-directional. The positions of the input and output ports can be readily reversed. in addition, the number of ports associated with each side of the PDR element can be readily expanded beyond two, particularly if $2^N$ ports are used on each side of the PDR element.

It should be noted that the polarization rotator 102 at each input port can either be operated as a digital switch (described above) or an analog splitter. When operated as an analog splitter, the polarization rotator 102 partially rotates the polarization of the beam pair, which results in complementary portions of the input beam being simultaneously routed to two output ports. For example, 10% of the input beam can be routed to the first output port and 90% can be routed to the second output port. This is often called a variable drop and continue function. The relative proportion of the input beam routed to each output port is determined the analog control voltage applied to the liquid-crystal polarization rotator 102. The analog control voltage can range between maximum and minimum values that correspond to the two digital control states described above.

The primary advantages of the present invention over the prior art are:

(1) The PDR element can be manufactured as one component, which allows for tighter tolerances in the optical angles translating into easier assembly, greater thermal stability, fewer air-to-glass interfaces (that cause reflection loss), and more reliable optical alignment than using separately mounted cubic prisms.

(2) Because there is a certain amount of leakage of the orthogonal polarization state (measured as contrast ratio) at each PBS coating interface, the optical signal goes through at least 2 PBS coatings in the PDR element before exiting. This effectively doubles the contrast ratios and results in lower cross-talk, as compared to rectangular PBSs.

(3) The use of a birefringent element at each I/O port maintains a substantially parallel signal path for each beam pair, which results in lower polarization mode dispersion and reduced polarization-dependent losses. This optical configuration is also simpler, less expensive, and is easier to fabricate than Meadows' design.

N×M Optical Routing Switch

Figure 4:
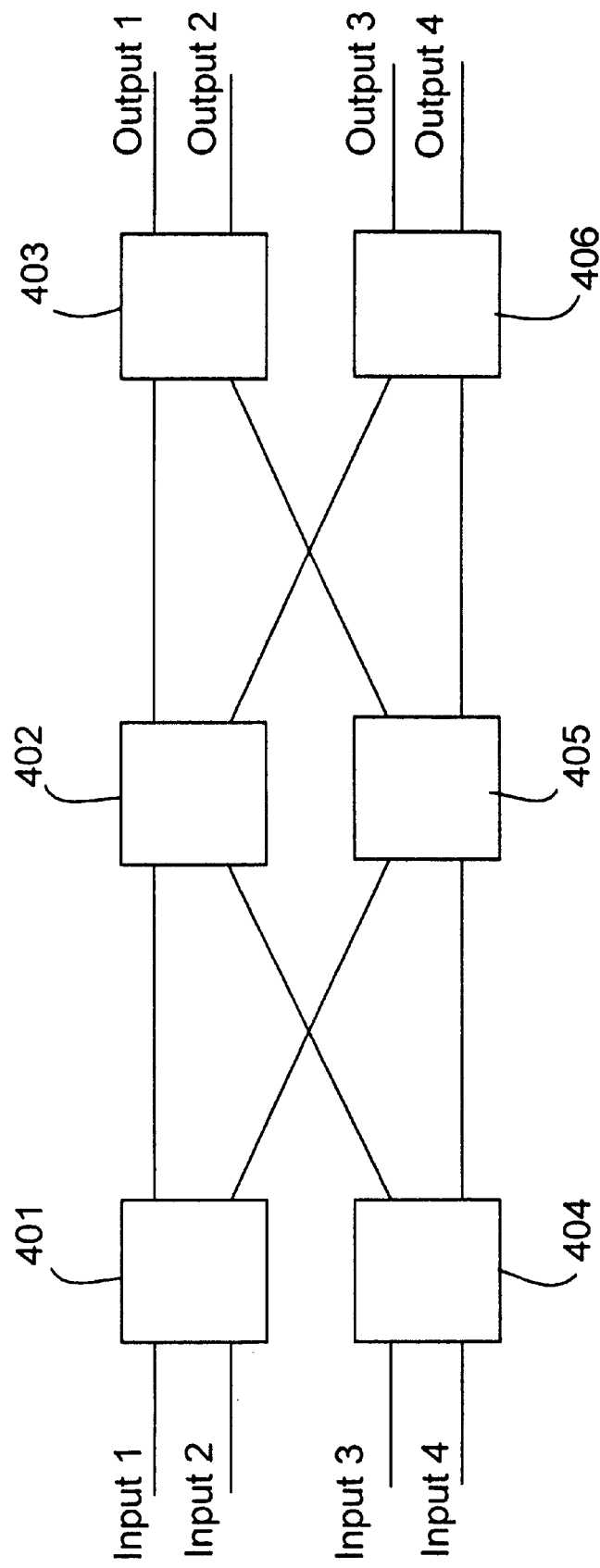
FIG. 4 is a block diagram generally showing the manner in which six 2×2 optical routing switches 401–406 can be configured to create a 4×4 optical routing switch.
Figure 5:
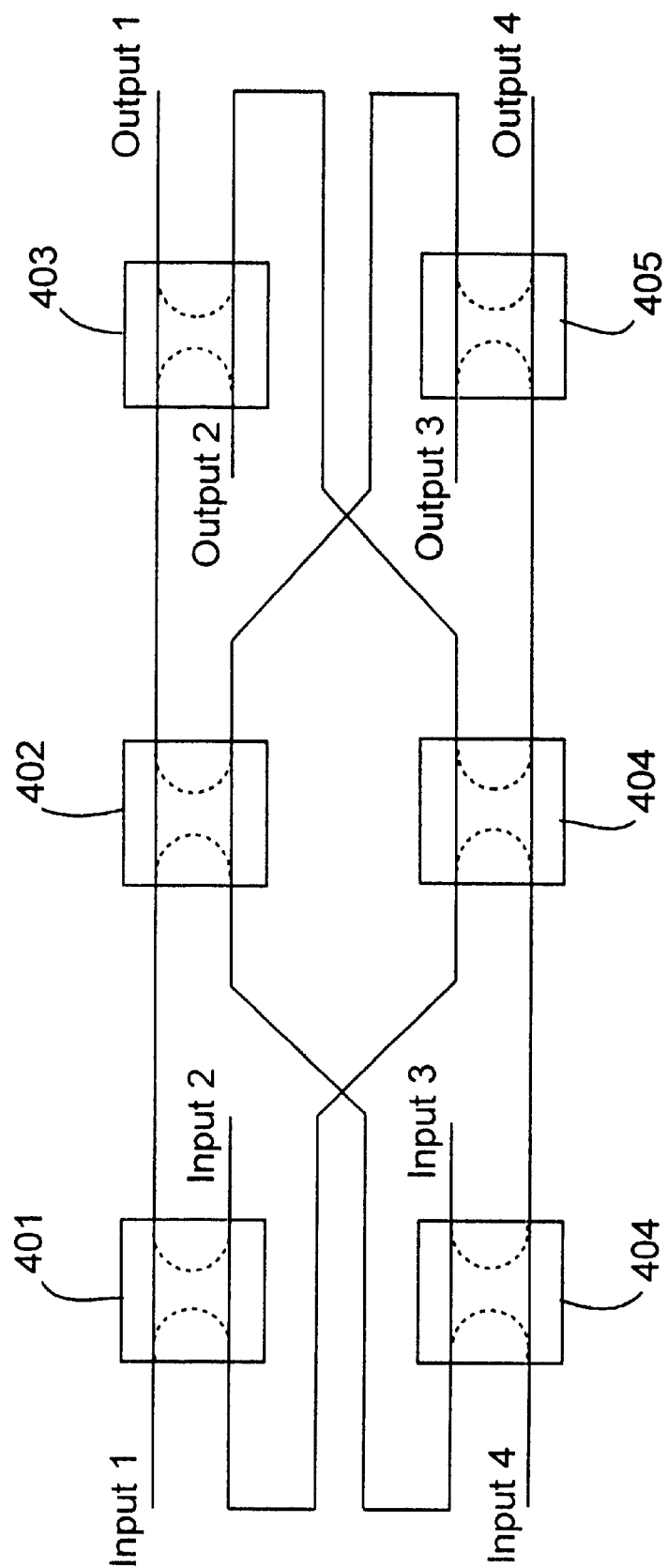
FIG. 5 is a block diagram based on FIG. 4 showing the manner in which six of the present 2×2 optical routing switches can be configured to create a 4×4 optical routing switch.

With the X-cube switch configurations such as the 2×2 switch illustrated in FIGS. 1 and 2, a basic building block for larger N×M switches can be built. For example, FIG. 4 is a block diagram generally showing how six 2×2 optical routing switches 401–406 can be configured to create a 4×4 optical routing switch. FIG. 5 is a block diagram based on FIG. 4 showing the manner in which six of the present 2×2 optical routing switches can be configured to create a 4×4 optical routing switch. This concept can be expanded to accommodate any number of input and output ports to create an N×M optical routing switch. For example, multiple PDR elements can be combined to create a network for programmably routing optical signals from the input ports to the output ports. Other optical elements can also be used in this optical routing network.

Protection Switch

Figure 6A:
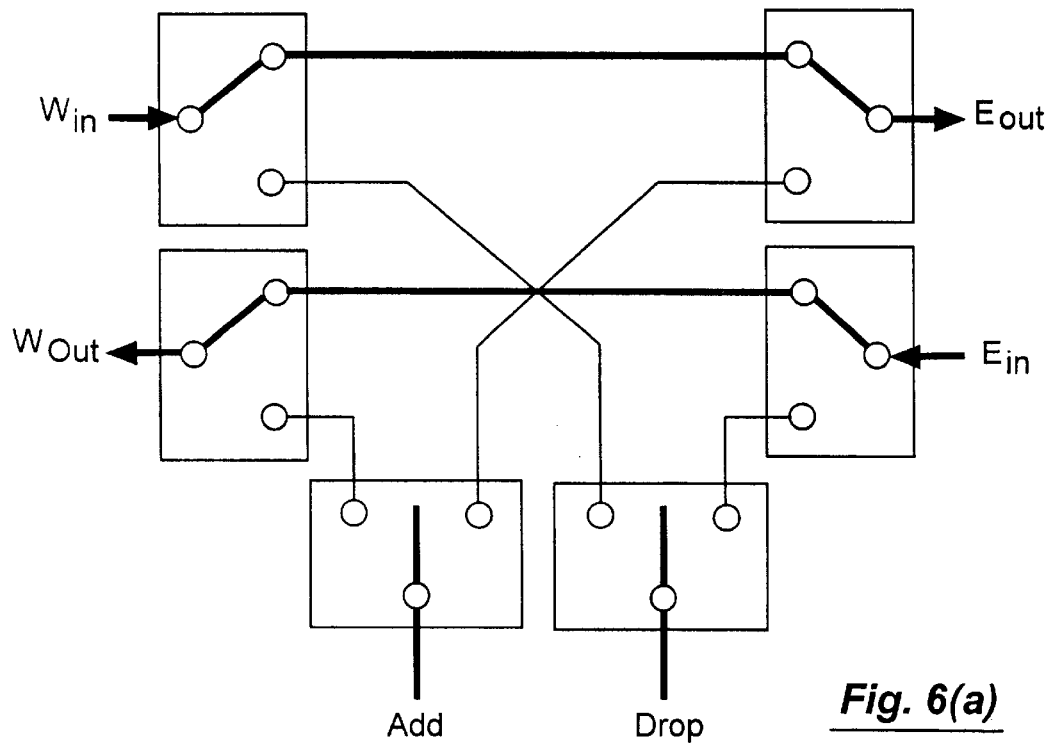
FIGS. 6(a) through 6(f) are block diagrams of an alternative embodiment of the present invention as an east/west protection switch.
Figure 6B:
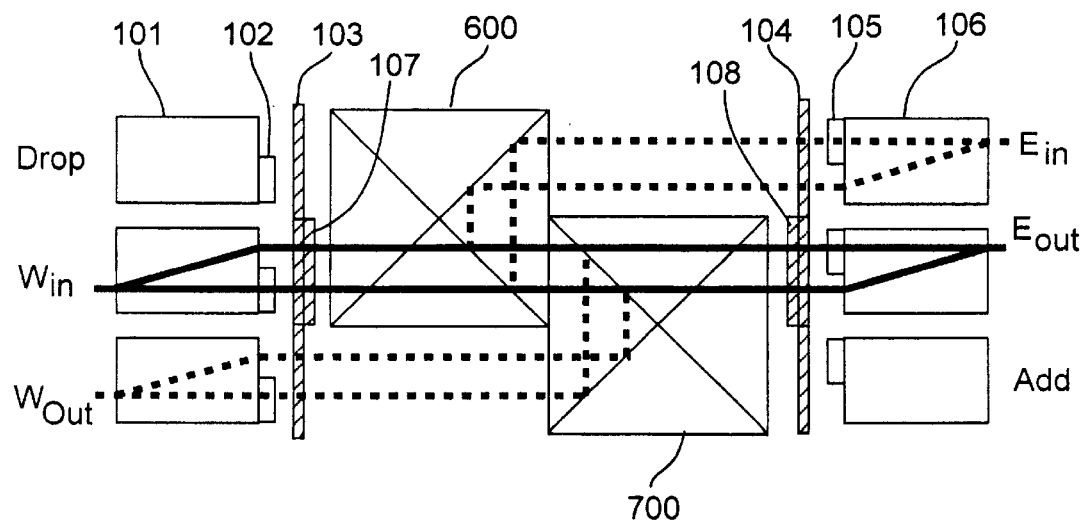
Figure 6C:
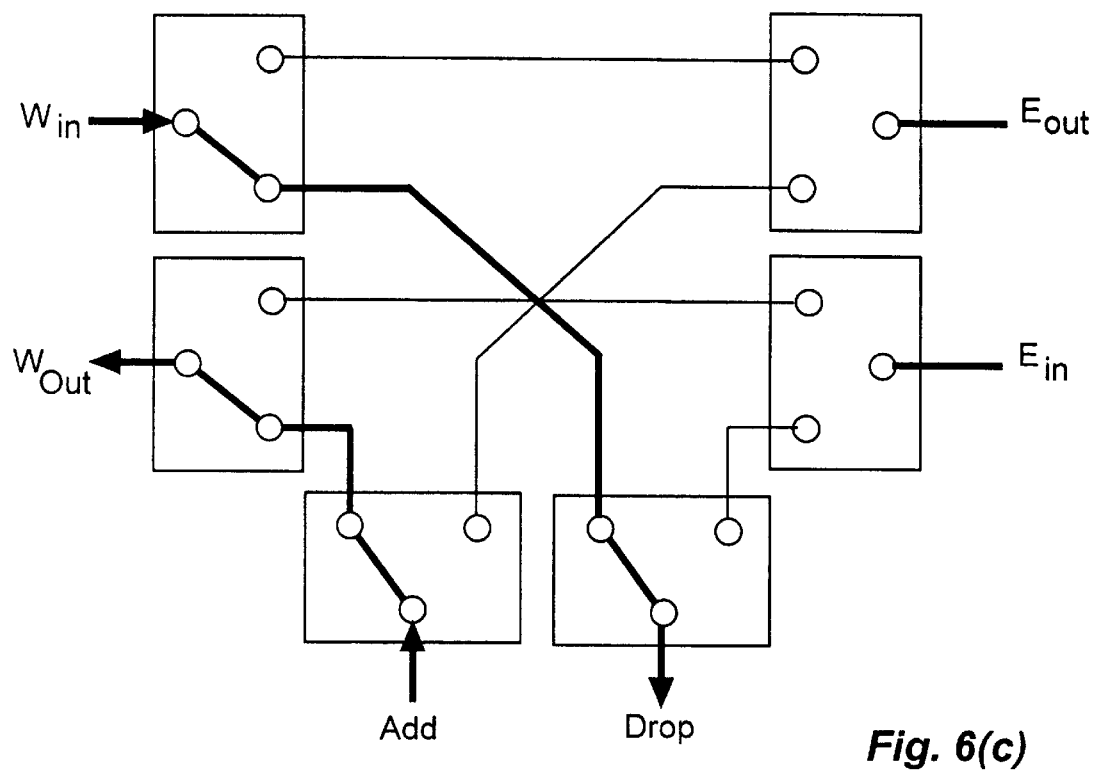
Figure 6D:
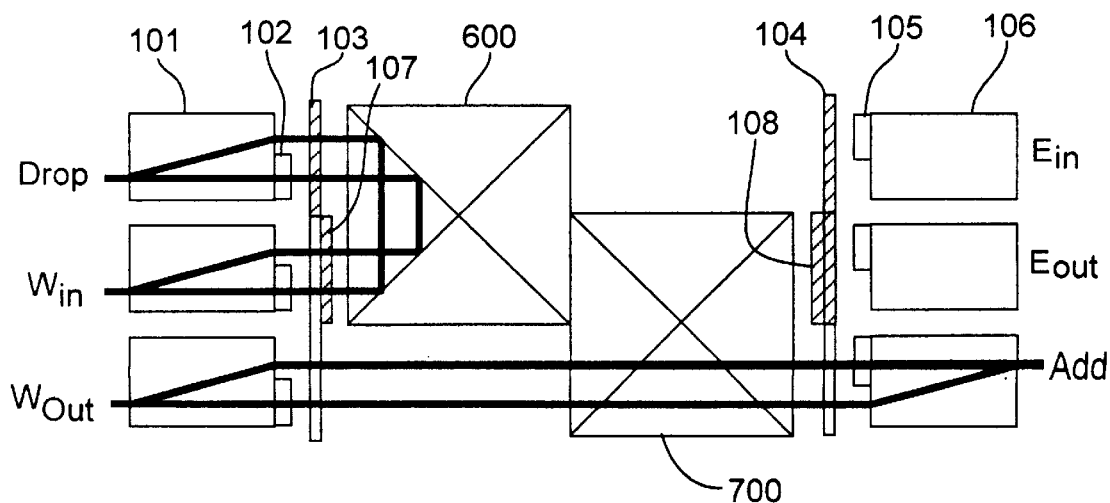
Figure 6E:
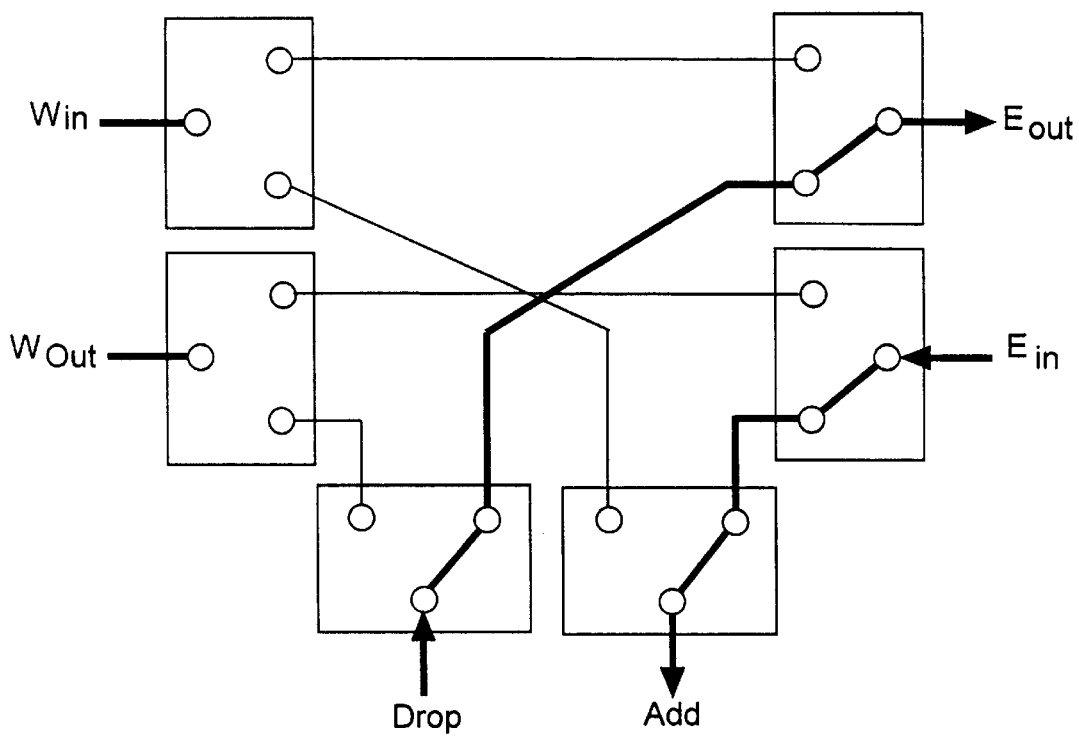
Figure 6F:
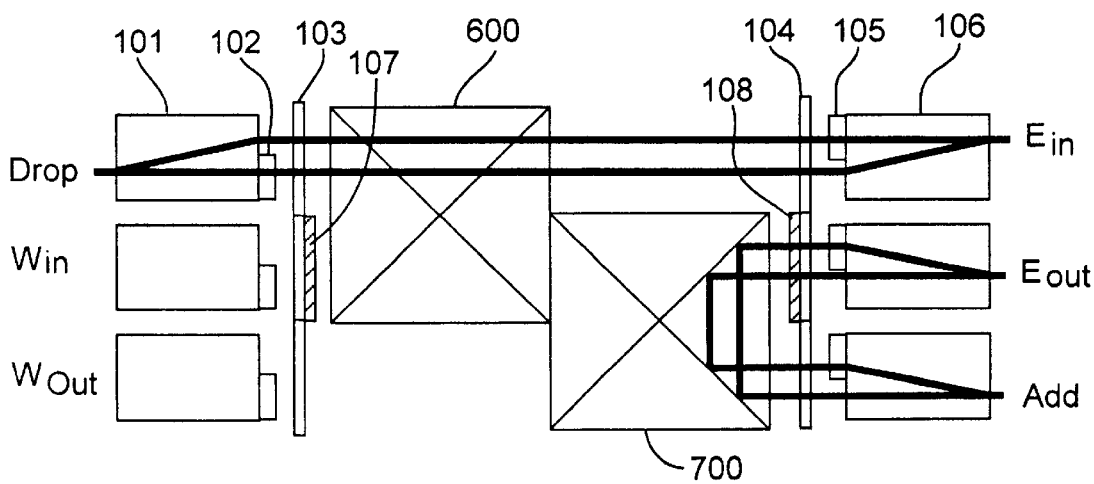

FIGS. 6(a) through 6(f) are block diagrams of an alternative embodiment of the present invention implemented as a protection switch joining two optical rings (i.e., an east ring and a west ring). This switch is generally similar to the 2×2 switch discussed above, but includes two PDR elements 600, 700 in an offset relationship with respect to one another, as shown in FIGS. 6(b), 6(d), and 6(f). The switch has six I/O ports, designated as the west input ($W_{IN}$), west output ($W_{OUT}$), east input ($E_{IN}$), east output ($E_{OUT}$), add, and drop ports, respectively.

Turning to FIG. 6(d), the first PDR element 600 has a first port (Drop) aligned to communicate with a second port ($W_{IN}$) along a reflected optical path through the first PDR element 600. A third port ($E_{IN}$) is aligned to communicate with the Drop port along a transmitted optical path through the first PDR element 600, as shown in FIG. 6(f).

The second PDR element 700 has a fourth port ($W_{OUT}$) aligned to communicate with the $E_{IN}$ port along a reflected optical path through both the first and second PDR elements 600 and 700, as illustrated in FIG. 6(b). A fifth port ($E_{OUT}$) is aligned to communicate with the $W_{IN}$ port along a transmitted optical path through the first and second PDR elements 600 and 700, as also shown in FIG. 6(b). A sixth port (Add) is aligned to communicate with the $W_{OUT}$ port along a transmitted optical path through the second PDR element 700 (FIG. 6(d)), or to communicate with the $E_{OUT}$ port along a reflected optical path through the second PDR element 700 (FIG. 6(f)) determined by the control state of the switch.

FIGS. 6(a), 6(c), and 6(e) are schematic representations of the three control states of the switch corresponding to FIGS. 6(b), 6(d), and 6(f), respectively. As before, the control states are programmably selected by an external controller that controls the polarization rotators 103 and 104.

The first control state (i.e., the "through" control state) is depicted in FIGS. 6(a) and 6(b), In this first control state, input optical signals from the $W_{IN}$ port are transmitted through the first and second PDR elements 600, 700 to the $E_{OUT}$ port, and input optical signals from the $E_{IN}$ port are reflected by the first and second PDR elements 600, 700 to the $W_{OUT}$ port. This control state corresponds to normal operation of the optical link between the east and west rings.

The second control state (i.e., the "drop west" control state) is shown in FIGS. 6(c) and 6(d), In this second control state, input optical signals from the $W_{IN}$ port are reflected by the first PDR element 600 to the Drop port, and input optical signals from the Add port are transmitted through the second PDR element 700 to the $W_{OUT}$ port. This control state provides a means for substituting optical communications through the Add and Drop ports in the event of the fault in the east optical ring.

The third control state (i.e., the "drop east" control state) is shown in FIGS. 6(e) and 6(f). In this third control state, input optical signals from the $E_{IN}$ port are transmitted through the first PDR element 600 to the Drop port, and input optical signals from the Add port are reflected by the second PDR element 700 to the $E_{OUT}$ port. This control state provides a means for substituting an optical communications through the Add and Drop ports in the event of the fault in the west optical ring.

Additional control states can be achieved if the switch is operated in analog mode. As previously described, applying an analog control signal to the polarization rotators of the input ports can be used to attain infinite control over the distribution of each input beam to the output ports. For example, an analog control signal applied to the polarization rotator 103 for the $W_{IN}$ port can be used to create a fourth control state (i.e., the "split $W_{IN}$" control state), in which a portion of the input optical signals from the $W_{IN}$ port are routed to the $E_{OUT}$ port and the remaining portion of the input optical signals from the $W_{IN}$ port are routed to the Drop port. Similarly, an analog control signal applied to the polarization rotator 104 for the $E_{IN}$ port can be used to create a fifth control state (i.e., the "split $E_{IN}$" control state), in which a portion of the input optical signals from the $E_{IN}$ port are routed to the $W_{OUT}$ port and the remaining portion are routed to the Drop port.

Two additional half-wave plates 107 and 108 are placed adjacent to the polarization rotator arrays 103 and 104, respectively along the optical signal paths for the $W_{IN}$ and $E_{OUT}$ ports. These half-wave plates rotate the polarization of the beam pair by 90 degrees. This allows the switch to operate in the "through" control state (i.e., $E_{IN}$ to $W_{OUT}$, and $W_{IN}$ to $E_{OUT}$) when power is removed from the liquid crystal polarization rotator arrays 103, 104.

Double Ring Add/Drop Switch

FIGS. 7(a) through 7(f) are block diagrams of an embodiment of the present invention implemented as an add/drop switch. Here again, two offset PDR elements 600 and 700 are employed with six I/O ports. The optical components can be the same as those used in the east/west protection switch discussed above, although different control states are provided.

Figure 7A:
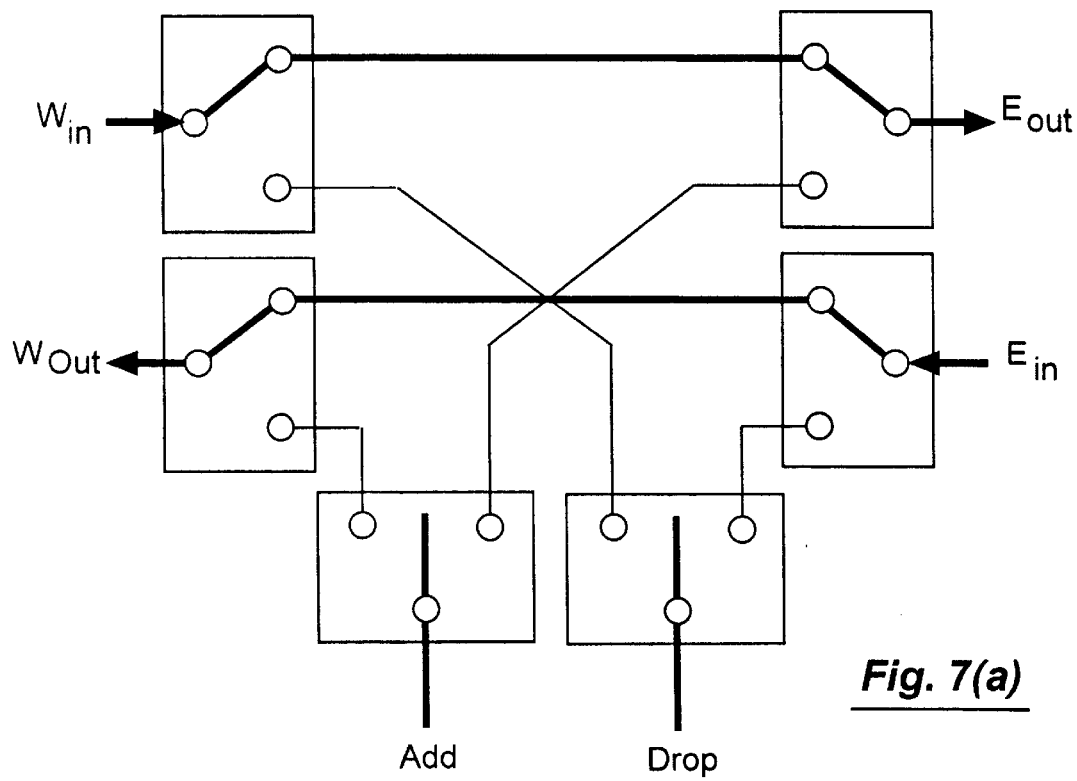
FIGS. 7(a) through 7(f) are block diagrams of an alternative embodiment of the present invention as a double ring add/drop switch.
Figure 7B:
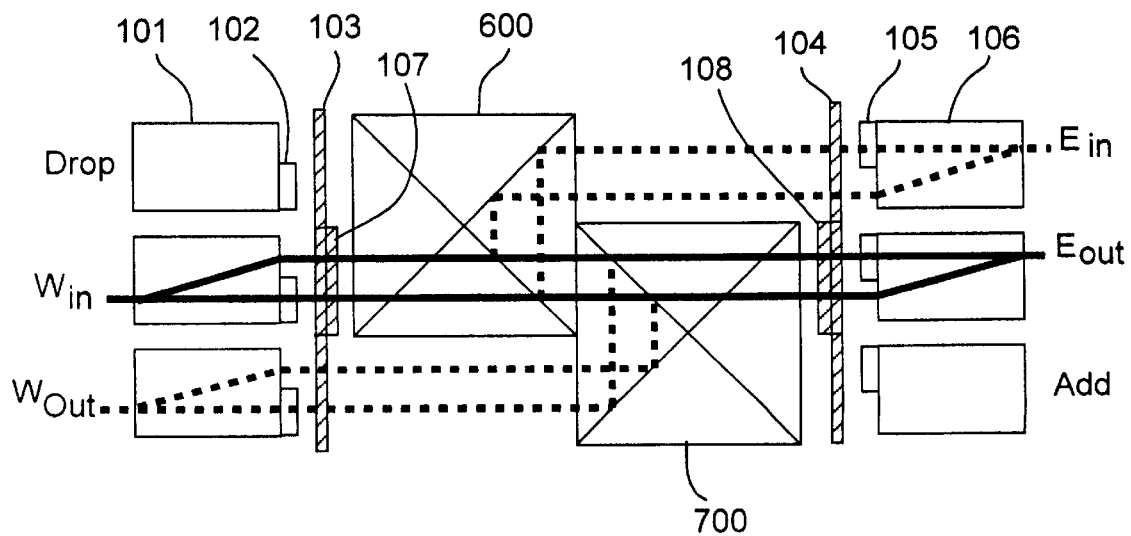
Figure 7C:
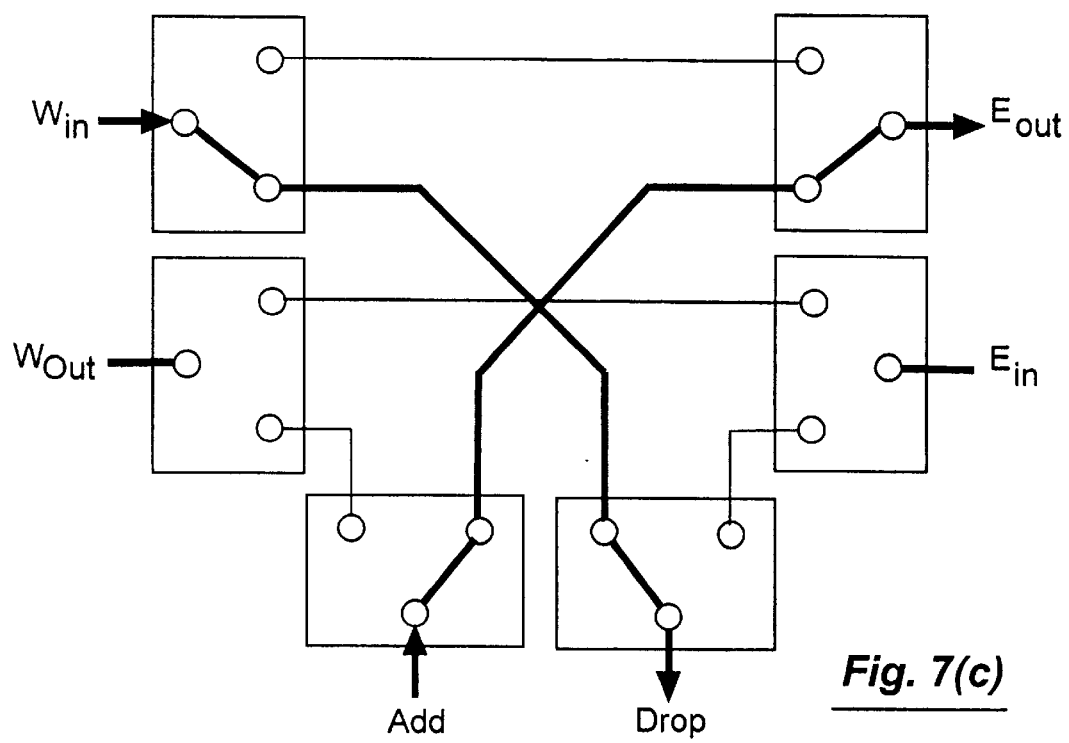
Figure 7D:
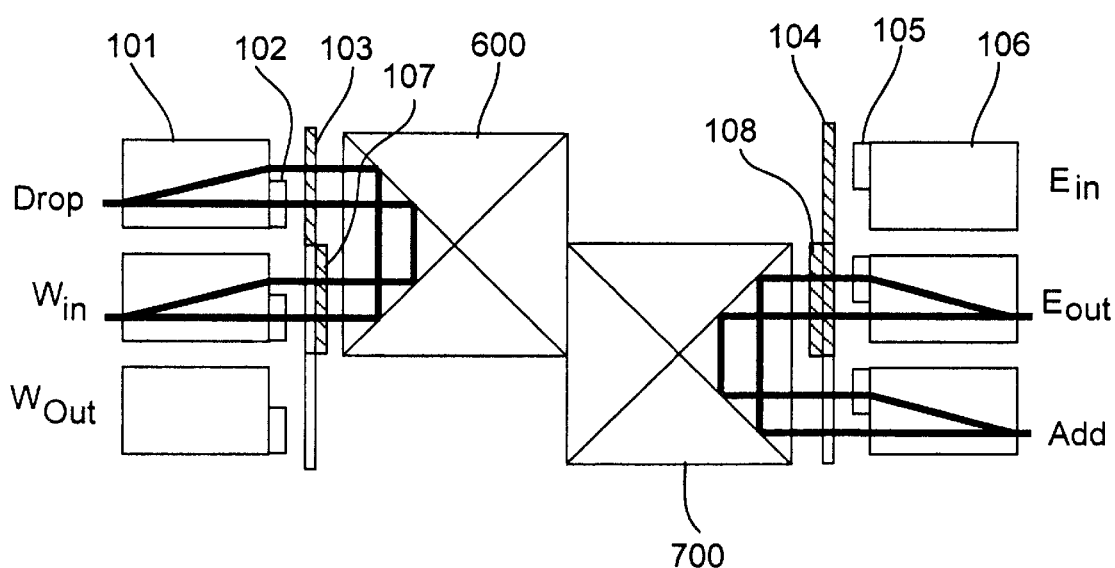
Figure 7E:
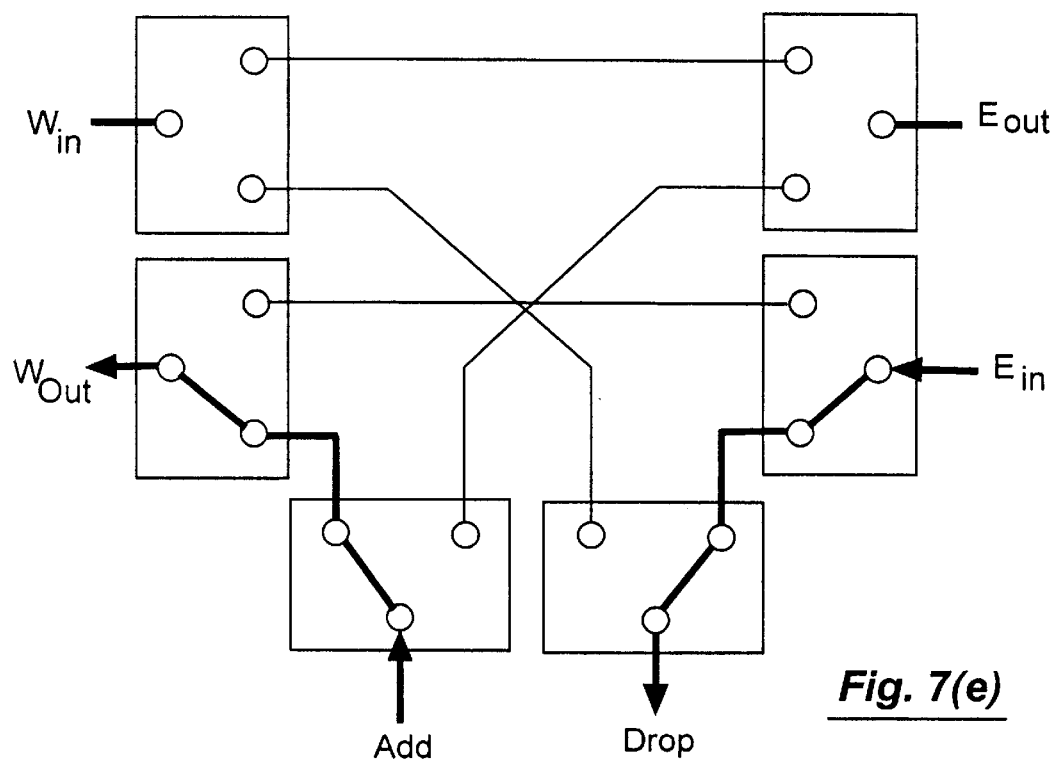
Figure 7F:
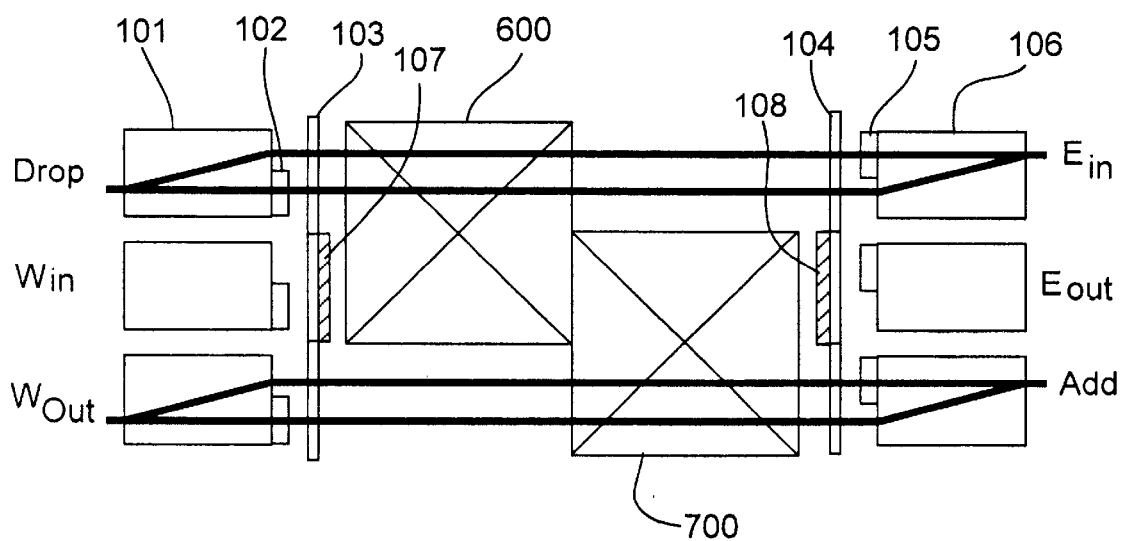

FIGS. 7(a), 7(c), and 7(e) are schematic representations of the three control states of the switch corresponding to FIGS. 7(b), 7(d), and 7(f), respectively. Here again, the control states are programmably selected by an external controller that controls the polarization rotators 103 and 104.

In the first control state depicted in FIGS. 7(a) and 7(b), input optical signals from the $W_{IN}$ port are transmitted through both PDR elements 600, 700 to the $E_{OUT}$ port, and input optical signals from the $E_{IN}$ port are reflected by both PDR elements 600, 700 to the $W_{OUT}$ port;

In the second control state shown in FIGS. 7(c) and 7(d), input optical signals from the $W_{IN}$ port are reflected by the first PDR element 600 to the Drop port, and input optical signals from the Add port are reflected by the second PDR element 700 to the $E_{OUT}$ port;

In the third control state illustrated in FIGS. 7(e) and 7(f), input optical signals from the $E_{IN}$ port are transmitted through the first PDR element 600 to the Drop port, and input optical signals from the Add port are transmitted through the second PDR element 700 to the $W_{OUT}$ port.

Here again, additional control states can be implemented by analog control of the polarization rotators at the input ports, so that input optical signals are simultaneously distributed to two output ports.

The above disclosure sets forth a number of embodiments of the present invention. Other arrangements or embodiments, not precisely set forth, could be practiced under the teachings of the present invention and as set forth in the following claims.

What is claimed is:

1. An optical routing switch comprising:
   a polarization-dependent routing element having:
      (a) a plurality of prisms joined to form a substantially X-shaped interface between said prisms; and
      (b) a polarizing beam splitter (PBS) coating in said interface between said prisms, so that said interface transmits light having a first polarization along a transmitted optical path and reflects lights having a second polarization orthogonal to said first polarization along a reflected optical path; and
   a plurality of input/output (I/O) ports aligned to communicate optical signals along said transmitted and reflected optical paths of said polarization-dependent routing element;
   wherein at least one of said I/O ports is an input port having:
      (a) a birefringent element spatially separating an input optical signal into a pair of orthogonally-polarized beams;
      (b) a polarization rotator rotating the polarization of at least one of the pair of beams so that both beams have substantially the same polarization determined by the control state of the optical routing switch; and
   wherein at least one of said I/O ports is an output port positioned to receive the pair of beams exiting said polarization-dependent routing element along one of said optical paths, said output port having:
      (a) a polarization rotator rotating the polarization of at least one of the pair of beams exiting said polarization-dependent routing element so that the beams have substantially orthogonal polarizations; and
      (b) a birefringent element combining the orthogonally-polarized beams from said polarization rotator of said output port into an output optical signal; and
   wherein one of the pair of beams propagates from the input port to the output port along a first optical path having a first path length and the other of the pair of beams propagates from the input port to the output port along a second optical path having a second path length substantially similar to the first path length.

2. The optical routing switch of claim 1 wherein said I/O ports comprise two input ports and two output ports arranged on opposing sides of said PDR element whereby said first output port receives the optical signal along a transmitted optical path through said PDR element from said first input port in a first control state, and receives the optical signal along a reflected optical path through said PDR element from said second input port in a second control state; and whereby said second output port receives the optical signal along a transmitted optical path through said PDR element from said second input port in the first control state, and receives the optical signal along a reflected optical path through said PDR element from said first input port in the second control state.

3. The optical routing switch of claim 1 wherein a first output port and said input port are aligned on opposing sides of said PDR element and said first output port receives the optical signal along a transmitted optical path through said PDR element from said input port in a first control state, and wherein a second output port and said input port are located on the same side of said PDR element and said second output port receives the optical signal along a reflected optical path through said PDR element from said input port in a second control state.

4. The optical routing switch of claim 1 wherein said polarization rotator of said input port comprises:
   a half-wave plate rotating the polarization of one of said pair of beams by 90 degrees; and
   a liquid crystal polarization rotator controllably rotating the polarization of both beams by 90 degrees in a first control state and by zero degrees in a second control state.

5. The optical routing switch of claim 1 wherein said polarization rotator of said output port comprises:
   a half-wave plate rotating the polarization of one of said pair of beams by 90 degrees; and
   a liquid crystal polarization rotator controllably rotating the polarization of both beams by 90 degrees in a first control state and by zero degrees in a second control state.

6. The optical routing switch of claim 1 wherein said polarization rotator of said input port is controlled by an analog control signal to simultaneously route a portion of the input optical signal to a first output port and portion of the input optical signal to a second output port.

7. The optical routing switch of claim 1 wherein the one of the pair of beams propagates the first path length in a first propagation time and the other of the pair of beams propagates the second path length in a second propagation time substantially similar to the first propagation time.

8. A 2×2 optical routing switch comprising:
a polarization-dependent routing (PDR) element having:
(a) a plurality of prisms joined to form a substantially X-shaped interface between said prisms; and
(b) a polarizing beam splitter (PBS) coating in said interface between said prisms, so that said interface transmits light having a first polarization along a transmitted optical path and reflects lights having a second polarization orthogonal to said first polarization along a reflected optical path; and
two input ports having:
(a) a birefringent element spatially separating an input optical signal into a pair of orthogonally-polarized beams; and
(b) a polarization rotator rotating the polarization of at least one of the pair of beams so that both beams for each input port have substantially the same polarization determined by the control state of the optical routing switch; and
two output ports having:
(a) a polarization rotator rotating the polarization of at least one of the pair of beams exiting said PDR element so that the beams have substantially orthogonal polarizations; and
(b) a birefringent element combining the orthogonally-polarized beams from said polarization rotator into an output optical signal for each output port;
wherein said first output port receives the optical signal along a transmitted optical path through said PDR element from said first input port in a first control state, and receives the optical signal along a reflected optical path through said PDR element from said second input port in a second control state;
wherein said second output port receives the optical signal along a transmitted optical path through said PDR element from said second input port in the first control state, and receives the optical signal along a reflected optical path through said PDR element from said first input port in the second control state; and
wherein one of the pair of beams propagates from an input port to an output port along a first optical path having a first path length and the other of the pair of beams propagates from an input port to an output port along a second optical path having a second path length substantially similar to the first path length.

9. The optical routing switch of claim 8 wherein said first input port and said second output port are located on the same side of said PDR element, and wherein said second input port and said first output port are located on the same side of said PDR opposing said first input port and said second output port.

10. The optical routing switch of claim 8 wherein said polarization rotator of said input ports comprises:
a half-wave plate rotating the polarization of one of said pair of beams by 90 degrees; and
a liquid crystal polarization rotator controllably rotating the polarization of both beams by 90 degrees in a first control state and by zero degrees in a second control state.

11. The optical routing switch of claim 8 wherein said polarization rotator of said output ports comprises:
a half-wave plate rotating the polarization of one of said pair of beams by 90 degrees; and
a liquid crystal polarization rotator controllably rotating the polarization of both beams by 90 degrees in a first control state and by zero degrees in a second control state.

12. The optical routing switch of claim 8 wherein said polarization rotator of at one of said input ports is controlled by an analog control signal to simultaneously route a portion of the input optical signal to said first output port and portion of the input optical signal to said second output port.

13. The optical routing switch of claim 8 wherein the one of the pair of beams propagates the first path length in a first propagation time and the other of the pair of beams propagates the second path length in a second propagation time substantially similar to the first propagation time.

14. An optical routing switch comprising:
at least one input port having:
(a) a birefringent element separating an input beam into a pair of orthogonally-polarized beams; and
(b) polarization rotator selectively rotating the polarization of at least one of said pair of beams so that both beams have the same polarization determined by the control state of the optical routing switch;
a network of polarization-dependent routing (PDR) elements receiving said beams exiting said input port, wherein at least one of said PDR elements includes:
(a) a plurality of prisms joined to form a substantially X-shaped interface between said prisms; and
(b) a polarizing beam splitter (PBS) coating in said interface between said prisms, so that said interface transmits light having a first polarization along a transmitted optical path and reflects lights having a second polarization orthogonal to said first polarization along a reflected optical path;
a plurality of output ports aligned to communicate optical signals along said transmitted and reflected optical paths of said PDR element, each output port having:
(a) polarization rotator rotating the polarization of at least one of said pair of beams so that said beams are orthogonally polarized; and
(b) a birefringent element combining said orthogonally-polarized beams at said output port;
wherein one of the pair of beams propagates from an input port to an output port along a first optical path having a first path length and the other of the pair of beams propagates from an input port to an output port along a second optical path having a second path length substantially similar to the first path length.

15. The optical routing switch of claim 14 wherein a first output port and said input port are aligned on opposing sides of said PDR element and said first output port receives the optical signal along a transmitted optical path through said PDR element from said first input port in a first control state, and wherein a second output port and said input port are located on the same side of said PDR element and said second output port receives the optical signal along a reflected optical path through said PDR element from said input port in a second control state.

16. The optical routing switch of claim 14 wherein the one of the pair of beams propagates the first path length in a first propagation time and the other of the pair of beams propagates the second path length in a second propagation time substantially similar to the first propagation time.

17. An optical routing switch having a switching configuration determined by a specified control state, said optical routing switch comprising:

a first polarization-dependent routing (PDR) element having:
- (a) a plurality of prisms joined to form a substantially X-shaped interface between said prisms; and
- (b) a polarizing beam splitter (PBS) coating in said interface between said prisms, so that said interface transmits light having a first polarization along a transmitted optical path and reflects lights having a second polarization orthogonal to said first polarization along a reflected optical path;
- (c) a first port;
- (d) a second port aligned to communicate with said first port along a reflected optical path through said first PDR element; and
- (e) a third port aligned to communicate with said first port along a transmitted optical path through said first PDR element;

a second PDR element having:
- (a) a plurality of prisms joined to form a substantially X-shaped interface between said prisms; and
- (b) a polarizing beam splitter (PBS) coating in said interface between said prisms, so that said interface transmits light having a first polarization along a transmitted optical path and reflects lights having a second polarization orthogonal to said first polarization along a reflected optical path;
- (c) a fourth port aligned to communicate with said third port along a reflected optical path through said first PDR element and said second PDR element;
- (d) a fifth port aligned to communicate with said second port along a transmitted optical path through said first PDR element and said second PDR element; and
- (e) a sixth port aligned to communicate with said fourth port along a transmitted optical path through said second PDR element, and to communicate with said fifth port along a reflected optical path through said second PDR element;

wherein at least one of said ports is an input port having:
- (a) a birefringent element spatially separating an input optical signal into a pair of orthogonally-polarized beams; and
- (b) a polarization rotator rotating the polarization of at least one of the pair of beams so that both beams have substantially the same polarization determined by the control state of the optical routing switch; and wherein at least one of said ports is an output port having:
- (a) a polarization rotator rotating the polarization of at least one of the pair of beams exiting a PDR element so that the beams have substantially orthogonal polarizations; and
- (b) a birefringent element combining the orthogonally-polarized beams from said polarization rotator of said output port into an output optical signal.

18. The optical routing switch of claim 17 further comprising:
- (a) a first control state wherein input optical signals from said second port are transmitted through said first and second PDR elements to said fifth port, and input optical signals from said third port are reflected by said first and second PDR elements to said fourth port;
- (b) a second control state wherein input optical signals from said second port are reflected by said first PDR element to said first port, and input optical signals from said sixth port are transmitted through said second PDR element to said fourth port; and
- (c) a third control state wherein input optical signals from said third port are transmitted through said first PDR element to said first port, and input optical signals from said sixth port are reflected by said second PDR element to said fifth port.

19. The optical routing switch of claim 17 further comprising:
- (a) a first control state wherein input optical signals from said second port are transmitted through said first and second PDR elements to said fifth port, and input optical signals from said third port are reflected by said first and second PDR elements to said fourth port;
- (b) a second control state wherein input optical signals from said second port are reflected by said first PDR element to said first port, and input optical signals from said sixth port are reflected by said second PDR element to said fifth port; and
- (c) a third control state wherein input optical signals from said third port are transmitted through said first PDR element to said first port, and input optical signals from said sixth port are transmitted through said second PDR element to said fourth port.

* * * * *